April 28, 1953 W. H. T. HOLDEN 2,637,017
TRANSLATING CIRCUIT
Filed Aug. 13, 1949
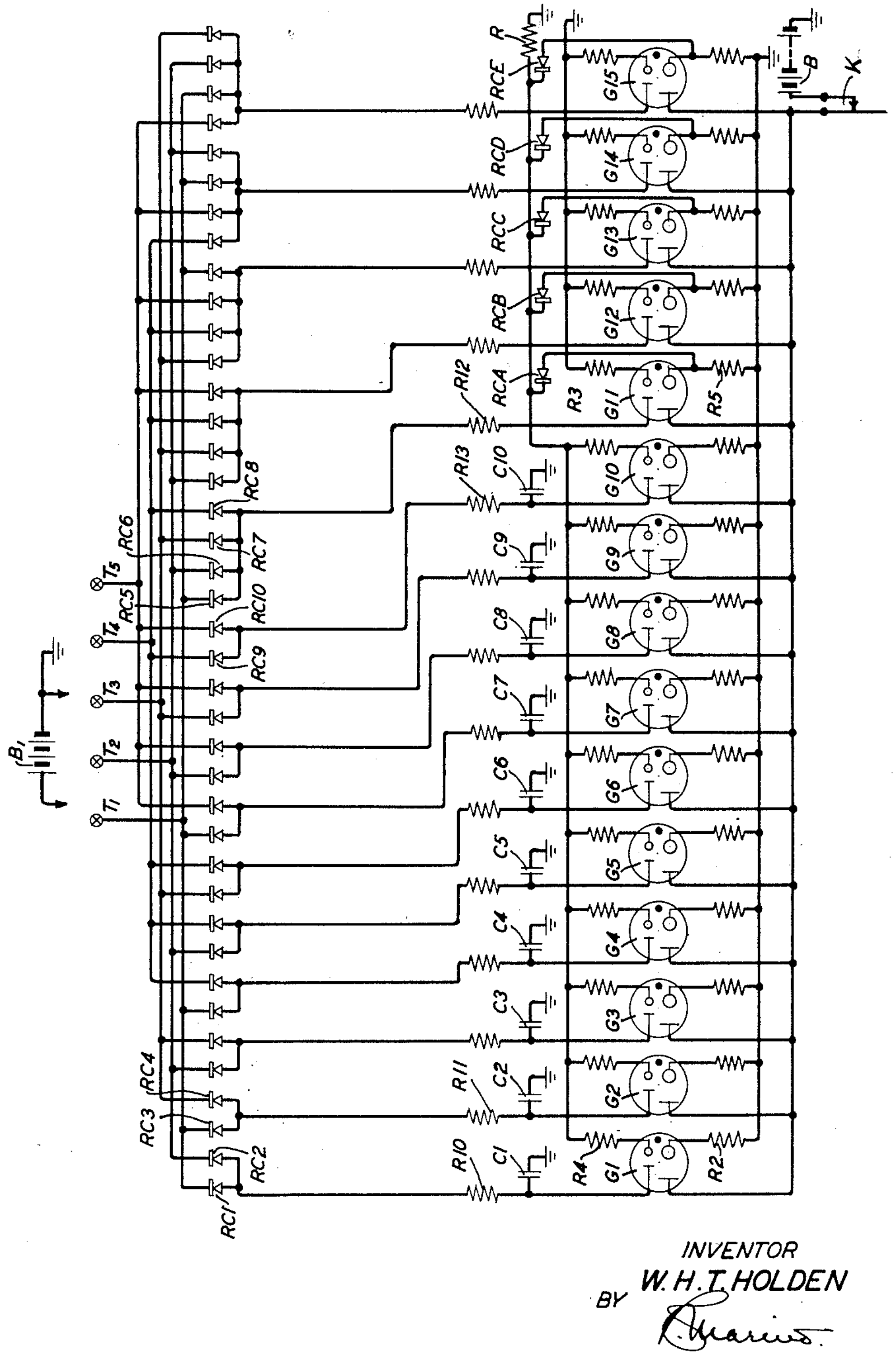
INVENTOR
W. H. T. HOLDEN
BY
ATTORNEY Patented Apr. 28, 1953

2,637,017

UNITED STATES PATENT OFFICE 2,637,017

TRANSLATING CIRCUIT

William H. T. Holden, Woodside, N. Y., assignor to Bell Telephone Laboratories, Incorporated, New York, N. Y., a corporation of New York Application August 13, 1949, Serial No. 110,054

2 Claims. (Cl. 340—167)

This invention relates to translating circuits. Digits may be registered or indicated in an electrical circuit by energizing a different one of ten elements for each different digit. The use of combination codes for this purpose is, however, often more convenient. Each of the ten digits can be indicated or registered by energizing a different combination of two of five elements for each digit, and this is a widely-used system. More indications or registrations can be obtained from the same number of elements by using combinations of more than one number of the elements, for example, combinations of two elements and combinations of four elements, which permit fifteen different indications or registrations with five elements.

However, the use of the two-out-of-five code to provide ten different indications does not represent the maximum number of different codes obtainable from five elements. The well-known Baudot code used in printing telegraph systems, for example, has one code of no elements operated, five codes with one element operated, ten codes with two elements operated, ten codes with three elements operated, five codes with four elements operated and one code with all five elements operated, or a total of thirty-two codes. In this system the no elements operated code is usable because of an additional sixth code element: the start-stop signal. But this code is prone to errors due to false operation of a code element or a failure to operate one code element. For this reason self-checking codes in which only two-out-of-five elements or only three-out-of-seven elements are used have become general in cases where errors must be avoided.

In the present invention it is proposed to utilize two-out-of-five or four-out-of-five, or more generally M-out-of-N and $M+n$-out-of-N code elements, in which $n$ is not less than 2. A single false operation, or a single drop-out, will then result in an unused code combination which can be detected by appropriate checking means.

It is often necessary, however, to translate indications or registrations in these combination codes into corresponding one-element indications or registrations. Where combinations of only one number of elements are used, this is readily done, but where combinations of more than one number of elements are used, it is more difficult. If, for example, the first and second of three elements are energized to indicate the digit "3," the second and third are energized to indicate the digit "4," and all three elements are energized to indicate the digit "5," means must be provided to prevent the energization of the first and second elements from being translated to the one-element code for "3," or the energization of the second and third elements from being translated to the one-element code for "4," when all three elements are energized at the same time to indicate the one element code for "5," and this is particularly difficult when the three elements are not all energized exactly simultaneously, as is bound to occur in practical operation.

The present invention discloses a novel circuit for translating indications in combination codes of more than one number of elements into the corresponding one-element indications. Features of the invention are a means for delaying the indications that would normally be given by the energization of a lesser number of elements, and a means for preventing said indications if, within the period of the relay, a greater number of elements are energized.

These and other features of the invention will be apparent from the accompanying description, the appended claims, and the drawing which shows a circuit for translating indications in codes of two and four of five elements into the corresponding one-element indications.

In the drawing, terminals T1 . . . T5 are five terminals which may be energized in combinations of two or combinations of four to represent any of the numbers 1 . . . 15. These terminals are energized by connecting the positive pole of a suitable battery B1 to them, by any suitable means, as follows:

| Terminals Energized | Number Represented |
|---|---|
| T1, T2 | 1 |
| T1, T3 | 2 |
| T2, T3 | 3 |
| T1, T4 | 4 |
| T2, T4 | 5 |
| T3, T4 | 6 |
| T1, T5 | 7 |
| T2, T5 | 8 |
| T3, T5 | 9 |
| T4, T5 | 10 |
| T1, T2, T3, T4 | 11 |
| T2, T3, T4, T5 | 12 |
| T1, T3, T4, T5 | 13 |
| T1, T2, T4, T5 | 14 |
| T1, T2, T3, T5 | 15 |

In each combination, the terminals not energized in accordance with the table above are connected, by any suitable means, to ground. Battery B1 is shown only by way of illustration as, of course, potential for application to terminals T1 . . . T5 may be obtained from any suitable source.

Each of the gas tubes G1 . . . G15, when conducting, is taken to represent one of the numbers 1 . . . 15, indicated by the designation of said tube. Thus, conduction in tube G1 represents the number "1" and conduction in tube G15 represents the number "15." The tubes are of the type having four elements, the lower left element of each tube being the main anode, the lower right element the main cathode, the upper left element the starter anode, and the upper right element the starter cathode. In tubes of this type, if a suitable potential is maintained between the main anode and the main cathode, insufficient in itself to cause conduction, conduction between the starter anode and starter cathode immediately causes conduction between the main anode and the main cathode.

The main cathode of each of the tubes G1 . . . G15 is connected to ground through an individual resistor, resistor R2, for example, being the resistor for tube G1. The main anode of each of said tubes is supplied with positive potential from the battery B through closed contacts K. The potential of battery B is such that the difference of potential thus produced between the main anode and the main cathode of each of the tubes G1 . . . G15 is insufficient to initiate conduction in any of said tubes but sufficient to cause conduction between the main anode and the main cathode of any tube in which conduction takes place between its starter anode and starter cathode.

The starter cathode of each of the tubes G11 . . . G15 is connected to ground through an individual resistor, resistor R3, for example, being the resistor for tube G11. The starter cathode of each of the tubes G1 . . . G10 is likewise connected to ground through an individual resistor (resistor R4, for example, being the resistor for tube G1) and resistor R. The latter cathodes are also connected through the rectifiers RCA . . . RCE, respectively, to the main cathode of each of tubes G11 . . . G15.

The starter anode of each of the tubes G1 . . . G15 is connected through an individual resistor and rectifiers to particular ones of the terminals T1 . . . T5 in accordance with the code given above, resistor R10 and rectifiers RC1 and RC2, for example, being the resistor and rectifiers for tube G1. The starter anode of each of the tubes G1 . . . G10 is also connected through an individual capacitor to ground, capacitor C1, for example, being the capacitor for tube G1.

The connection of the starter anode of each of the tubes G1 . . . G15 to the appropriate combination of rectifiers is made by connecting the "low resistance" terminals of all of the rectifiers in said combination in parallel to the starter anode of the involved tube, the "high resistance" side of each of the rectifiers in the combination being connected to one of the terminals of the group of terminals T1 . . . T5 as above indicated. It is well known, of course, that a rectifier offers high resistance to the passage of current in one direction and low resistance to its passage in the opposite direction. Therefore, with the rectifiers connected to the terminals T1 . . . T5 and to the starter anodes of the tubes G1 . . . G15 as above described, the application of the positive pole of battery B1 to the terminals of T1 and T2, for example, will result in the passage of very little current through the circuit path comprising rectifiers RC1 and RC2, resistor R10, capacitor C1, to ground, in consequence of which the common terminal of rectifiers RC1 and RC2 will be raised to a value but slightly less than the potential of the battery. If the battery is applied to said terminals for a sufficient time, capacitor C1 will be charged. On the other hand, if battery B1 is applied to terminal T1 and ground is applied to terminal T2, among others, as would be the case, for example, if the number "3" were to be indicated, the current circulating through the above traced path will be very high owing to the fact that the current flow is now in the opposite direction. As a consequence, the common terminal of the rectifiers RC1 and RC2 will be practically at ground potential and capacitor C1 will not be charged. Thus when the positive battery B1 is applied to all the upper terminals of a combination of rectifiers, the capacitor C— connected to the joined lower terminals of said rectifiers will be charged. If, however, battery B1 is applied to some of said upper terminals and ground is applied to the remainder of said terminals, the capacitor C— will not be charged.

Assume, now, that positive potential from battery B1 is applied to terminals T1 and T2 to represent the number "1" in the code given above, each of terminals T3 . . . T5 being grounded as described above. The positive potential at terminals T1 and T2 is transmitted through rectifiers RC1 and RC2 and resistor R10 to capacitor C1. The positive potential at terminal T1 is also applied to rectifier RC3 and ground potential at terminal T3 is applied to rectifier RC4. Owing to the relative poling of the rectifiers RC3 and RC4 as above set forth, the resultant potential at their junction is that of ground, also as above set forth, and a similar condition exists in respect to each of the pairs of rectifiers associated with tubes G3 . . . G10. Capacitor C1, therefore, charges while capacitors C2 . . . C10 do not charge. Positive potential at terminals T1 and T2 is also applied to rectifiers RC5 and RC6, but ground potential at terminals T3 and T4 is applied to rectifiers RC7 and RC8, while a similar condition exists in respect to each of the groups of rectifiers associated with tubes G12 . . . G15, positive potential being applied to one or two of the rectifiers of the group and ground potential being applied to the remainder. The resultant potential at the junction of the rectifiers of each group, and, therefore, at the starter anodes of tubes G11 . . . G15, is that of ground, and none of said tubes is thereby fired.

After capacitor C1 is charged, the potential of the starter anode of tube G1 reaches the potential of terminals T1 and T2, at which time tube G1 is rendered conducting through its control gap over a circuit extending from said potential at the starter anode, the starter anode-starter cathode space of tube G1, resistor R4, and resistor R to ground, whereupon condenser C1 discharges in this circuit and conduction is induced in the main gap of the tube over a circuit traced from the positive pole of battery B, contacts K, through the main anode-main cathode space of tube G1, and resistor R2 to ground. Conduction in the latter circuit indicates the number "1" in single-element code, and the representation of the number may be obtained by observing the glow of said tube or the potential drop in resistor R2 may be used to control any suitable device for indicating, registering, or recording the number. It should be observed that the function of condenser C1 for tube G1 (and each of the other condensers for each of the other tubes) is to delay, by the charging time of the condenser, the breakdown of the tube through its control gap.

In a similar manner, energization of any two of the terminals T1 . . . T5, in accordance with the table given above, causes conduction in the corresponding one of tubes G1 . . . G10, indicating in single-element code the number represented in combination code by the energization of said terminals.

If, however, terminals T1, T2, T3 and T4 are energized in the manner described above to represent the number "11" in combination code, the positive potential on terminals T1 and T2 is transmitted through rectifiers RC1 and RC2 and resistor R10 to capacitor C1, charging said capacitor, and the positive potential on terminals T3 and T4 is transmitted through rectifiers RC9 and RC10 and resistor R13 to capacitor C10, charging capacitor C10. Positive potential from terminals T1, T2, T3 and T4 is also transmitted through rectifiers RC5 . . . RC8 in parallel and resistor R12 to the starter anode of tube G11. The charging of capacitors C1 and C10 through the high resistance of rectifiers RC1 and RC2 and resistor R10, and of rectifiers RC9 and RC10 and resistor R13, respectively, requires some time as previously observed. Before said capacitors are charged, however, tube G11 is rendered conductive through its control gap over a circuit extending from the positive pole of battery B1 through terminals T1, T2, T3 and T4, rectifiers RC5 . . . RC8 in parallel, resistor R12, the starter anode-starter cathode space of tube G11, and resistor R3 to ground, subsequently inducing conduction through the main gap of the tube over a circuit traced from the positive pole of battery B, contacts K, through the main anode-main cathode space of tube G11 and resistor R5 to ground. The main cathode of tube G11 thereby becomes positive due to the potential drop in resistor R5. This positive potential is transmitted through rectifier RCA and the individual resistors, of which resistor R4 is one, to the starter cathodes of all of the tubes G1 . . . G10, raising the potential of said starter cathodes so that none of said latter tubes will then be rendered conducting even if the positive potential of battery B1 is applied to the starter anodes of said tubes. Conduction takes place, therefore, only in tube G11 and said conduction indicates, in single-element code, the number "11," which is the number indicated in combination code by the energization of terminals T1, T2, T3 and T4. Similarly, the energization of any combination of four of the terminals T1 . . . T5, in the manner described above, causes conduction in the corresponding one of tubes G11 . . . G15 and indicates, in single-element code, the number represented in combination code by the energization of said terminals. When contacts K are opened in any suitable manner, the conducting tube is quenched, thus restoring the circuit to normal in readiness to produce another indication in accordance with the selective application of positive battery B1 and ground to the terminals T1 . . . T5.

It will be observed that if terminals T1 and T2 are energized in the manner described above, the actuation of tube G1, which would normally result therefrom, is delayed by the charging time of capacitor C1. If, during the period of this delay, terminals T3 and T4 are also energized, tube G11 is actuated, but the actuation of tube G1 and also the actuation of tube G10 is prevented as described above. Similarly, if any combination of two of the terminals T1 . . . T5 is energized but, within a short time thereafter, two more of said terminals are energized, the indication corresponding to the four terminals energized is produced, while all indications corresponding to combinations of two terminals are prevented.

The invention may also be used for the opposite translation, that is, for translating single-element indications into combination code indications. If any one of the tubes G1 . . . G15 is caused to conduct through its main gap by any suitable means when none of the terminals T1 . . . T5 is energized, an indication code corresponding to the conducting tube will be given at terminals T1 . . . T5. For example, if tube G1 is caused to conduct through its main gap, the starter anode of said tube assumes a potential comparable to the potential of the main anode thereof. This potential is transmitted through resistor R10 and rectifiers RC1 and RC2 to terminals T1 and T2. Similarly, if tube G11 is caused to conduct through its main gap, the resultant potential of its starter anode is transmitted through rectifiers RC5 . . . RC8 to terminals T1, T2, T3 and T4. These potentials represent, at terminals T1 . . . T5 in the code given above, the respective numbers represented by the conduction of tubes G1 and G11, and may be used to actuate any suitable device to indicate, register, or record said numbers. Any other of the numbers 1 . . . 15 may be similarly translated from single-element code to combination code.

Suitable means for arresting conduction in and restoring to normal any of tubes G1 . . . G15 which have been caused to conduct in the manners described above, may, of course, be provided so that the circuit may be used for successive translations. The rectifiers shown may be of any suitable type and resistors may be substituted for the rectifiers RC1, RC2, RC3, etc. Resistors, however, do not give as wide operating margins for tubes G1 . . . G15 as rectifiers, and rectifiers are, therefore, preferable. Other suitable types of tubes or similar devices may be substituted for tubes G1 . . . G15. The number of terminals T1 . . . T5 and the codes suggested are, of course, illustrative only. The invention is equally applicable to a different number of terminals and different codes. Other modifications and adaptations will readily occur to those skilled in the art.

The terms and expressions which I have used in reference to my invention are used as terms of description and not of limitation. I have no intention, in the use of such terms and expressions, of thereby excluding equivalents or modifications of the features shown and described, or parts thereof, but on the contrary, intend to include therein any and all equivalents and modifications which may be employed without departing from the spirit of the invention.

What is claimed is:

1. A translating circuit comprising a plurality of terminals electrically actuable in combinations of more than one number thereof, a gas-discharge device for each of said combinations, means comprising rectifiers responsive to the electrical actuation of said terminals according to any one of said combinations for operating the gas-discharge corresponding to the combination, means for causing a delay in the operation of said gas-discharge devices corresponding to combinations of one number of electrically actuated terminals, and means comprising rectifiers responsive to the operation of the gas-discharge devices corresponding to a greater number of said terminals electrically actuated for preventing the operation of any of the gas-discharge devices corresponding to combinations of said one number of terminals electrically actuated.

2. A translating circuit comprising a plurality of elements energizable in combinations of one predetermined number of said plurality and in combinations of a larger predetermined number of said plurality, the combinations of the larger number including as parts thereof the combinations of the smaller number, indicating means permanently connected to said elements in various combinations to be operated thereby, said indicating means being divided in two groups, one of the groups being connected to be selectively operated by the combinations of the lesser number and the other by the combinations of the larger number, means for delaying for a given time interval the operation of the first group, and means operated by the operation of any indicator in the second group during the delay period for preventing the operation of any indicator in the first group.

WILLIAM H. T. HOLDEN.

References Cited in the file of this patent

UNITED STATES PATENTS

| Number | Name | Date |
|---|---|---|
| 1,786,805 | Wensley | Dec. 30, 1930 |
| 2,095,730 | Bellamy | Oct. 12, 1937 |
| 2,400,574 | Rea et al. | May 21, 1946 |
| 2,441,557 | Bowne | May 18, 1948 |

FOREIGN PATENTS

| Number | Country | Date |
|---|---|---|
| 449,900 | Great Britain | Jan. 31, 1939 |